United States Patent [19]

Lee

[11] Patent Number: 4,851,216

[45] Date of Patent: * Jul. 25, 1989

[54] HYDROPHILIC SILICONE-ORGANIC COPOLYMER ELASTOMERS

[75] Inventor: Chi-Long Lee, Midland, Mich.

[73] Assignee: Dow Corning Corporation, Midland, Mich.

[ * ] Notice: The portion of the term of this patent subsequent to Jul. 15, 2003 has been disclaimed.

[21] Appl. No.: 212,456

[22] Filed: Jun. 28, 1988

Related U.S. Application Data

[60] Division of Ser. No. 20,216, Mar. 6, 1987, which is a division of Ser. No. 790,008, Oct. 22, 1985, abandoned, which is a continuation-in-part of Ser. No. 683,307, Dec. 18, 1984, abandoned.

[51] Int. Cl.$^4$ .............................................. A61K 31/74
[52] U.S. Cl. ................................. 424/78; 604/892.1; 424/486; 55/158; 210/500.27; 522/96
[58] Field of Search .................. 424/78, 486; 604/892; 55/158; 210/500.27; 522/96

[56] References Cited

U.S. PATENT DOCUMENTS 4,584,337 8/1986 Lee et al. ............................... 528/26
4,605,712 4/1986 Mueller et al. ....................... 528/26

*Primary Examiner*—Joseph L. Schofer
*Attorney, Agent, or Firm*—Susan M. Cornwall

[57] ABSTRACT

This invention provides compositions which are curable to hydrophilic, water-absorbing silicone-organic copolymer elastomers via free radical polymerization such as by the use of free radical precursors, ultraviolet light or electron beam radiation. The compositions are mixtures of (A) from 50 to 95 parts by weight of block copolymers containing polydiorganosiloxane segments and polyalkyleneoxy segments which block copolymers contain terminal aliphatically unsaturated groups such as those derived from the reaction of isocyanoethyl methacrylate with terminal free hydroxyl groups present on the polyalkyleneoxy segments and the polyalkyleneoxy segments are ultimately attached to the silicon atoms by means of a linkage formed by reaction with a diisocyanate compound and (B) from 5 to 50 parts by weight of at least one substantially water insoluble aliphatically unsaturated organic monomer which is compatible with (A) such as methyl methacrylate. The cured elastomers, some of which are optically clear, are useful as membranes for gas or fluid separations or for the controlled release of bioactive agents such as insecticides, herbicides, or drugs.

6 Claims, No Drawings

HYDROPHILIC SILICONE-ORGANIC COPOLYMER ELASTOMERS

BACKGROUND OF THE INVENTION

This application is a divisional of co-pending application U.S. Ser. No. 020,216 filed on Mar. 6, 1987, which is a divisional of application U.S. Ser. No. 790,008 filed on Oct. 22, 1986, which is a now abandoned continuation-in-part of U.S. Ser. No. 06/683,307, filed on Dec. 18, 1984, now abandoned.

This invention relates to compositions which are curable to hydrophilic, water-absorbing silicone-organic copolymer elastomers via free-radical polymerization. The hydrophilic elastomers ae useful as membranes for gas and other fluid separations and for the controlled release of drugs.

Polydiorganosiloxane elastomers such as those which are predominantly polydimethylsiloxanes typically exhibit high permeability to various types of gases as compared with organic elastomers. Polydimethylsiloxane elastomers generally possess hydrophobic surfaces (i.e., advancing water-in-air contact angles of greater than about 80° at 25° C. and more typically in the range of 95°–110°) due to the hydrophobic character of the polydimethylsiloxane chains forming the elastomer. As a result of their hydrophobic character, such elastomers tend to permit non-polar fluids and compounds to pass more readily through the elastomer than polar fluid such as water. It would be desirable to obtain an elastomer which possessed some of the high permeability characteristics of silicone elastomers, but which is hydrophilic and water-absorbing in nature, so as to more readily allow polar materials such as water, alcohols and polar bioactive agents such as hydrophilic drugs, insecticides or herbicides to pass through the elastomer. The hydrophilic character such as water-in-air contact angle and water absorbancy should be modifiable so as to enable one to adjust the rate at which a particular compound will permeate through the elastomer. If the hydrophilic, water-absorbing elastomer is to be used as a membrane for fluid separation, the elastomer should retain as much as possible of its original unhydrated physical properties such as tensile strength, elongation and tear strength after being hydrated and allowed to absorb water.

Attempts to provide such elastomers have been made in the past, particularly in the field of eye contact lenses where an oxygen permeable, soft, hydrophilic elastomeric material is desirable. U.S. Pat. No. 4,136,250 to Mueller, et al. (issued 1/23/79) provides a water-insoluble hydrophilic gel comprising about 20 to 90% by weight of (1) a hydrophilic (a) polymer of identical or different water-soluble monoolefinic monomers or (b) copolymer of said water-soluble monomers with 1 to 80% (of total monomers) of water insoluble, identical or different monoolefinic monomers; ingredient (1) is cross-linked with (2) about 10 to 80% by weight of a terminal polyolefinic siloxane macromer having a molecular weight of from about 400 to about 8500 to form a gel. Unlike the curable composition and hydrophilic elastomers of the present invention, Mueller, et al. teach that the siloxane macromer is the hydrophobic portion of the gel product and provides flexible cross-links and improved oxygen permeability. A water soluble monoolefinic monomer is required to be present as at least 20% by weight of the total monoolefinic monomers used to form the Mueller, et al. hydrogel. As will be described, it was found that the polysiloxane component of certain compositions can act as the hydrophilic portion within certain limits and therefore substantially water insoluble aliphatically unsaturated monomers can be used to the exclusion of water soluble monoolefinic monomers to obtain hydrophilic, water-absorbing silicone elastomers which are oxygen permeable.

European Patent Publication EP 0 109 355 A1 to Mueller, et al, (published June 6, 1983) is similar to the Mueller, et al. '250 Patent above, but places emphasis on the production of hard polysiloxane/organic free-radical polymerized copolymes for use as contact lenses. However, the '355 patent states that soft elastomers which are water absorbing can also be made using silicone polyether block copolymers as shown in Example 71. The polysiloxane component (8–70% of the copolymer) contains terminal olefinic radicals such as methacrylate radicals which are bonded to the polysiloxane via a diisocyanate or triisocyanate compound such as isophorone diisocyanate. The polysiloxane may contain polyalkyleneoxy radicals between the organosiloxy units and the terminal olefinic radicals. The organic monomer component (92–30%) can be composed of monolefinic monomers, diolefinic monomers or mixtures thereof of which, unlike the '250 patent, 85 to 100% of the total monomers are water insoluble monomers such as methyl methacrylate. The '355 Publication fails to teach the hereinafter described, elastomeric, water-swellable compositions of the present invention which differ in polysiloxane block copolymer structure from those of the '355 Publication.

U.S. Pat. No. 4,235,985 to Tanaka, et al. (issued 11/25/80) teaches copolymers for contact lenses which are a copolymer of an organosiloxane monomer which contains a pendant hydroxyl radical for hydrophilicity and may optionally contain a polyether group (to improve the hydrophilicity of the copolymer) and a hydrophobic methacrylic acid alkyl ester. The copolymer is said to be hydrophilic, but is hard and is substantially non-water absorptive unlike the water-absorbing elastomers of the present invention. The organosiloxane monomer is employed to provide both oxygen permeability and hydrophilicity (via the polyether segment), but differs in structure from those employed in the present invention.

U.S. Pat. No. 4,260,725 to Keogh, et al. (issued 4/7/81) teaches a water-absorbing, soft, hydrophilic, flexible contact lens which is oxygen permeable. It teaches a copolymer of organic monomers which may or may not have hydrophilic groups such as hydroxyl groups present therein with a polysiloxane which is alpha, omega-terminally bonded through divalent hydrocarbon groups to polymerizably activated unsaturated groups and which polysiloxane has hydrophilic sidechains. Keogh, et al. fails to teach the polysiloxanes employed in the present invention. When polyether sidechains are used to Keogh, et al., they prefer methoxy end-capped polyether sidechains. This differs from the aliphatically unsaturated terminal groups employed in the present invention which enable the entire polysiloxane block copolymer to form the elastomer and thereby contribute to the retention of physical properties after absorbing water. Furthermore, Keogh, et al. make no distinction between the use of water soluble monomers such as 2-hydroxyethylmethacrylate versus substantially water insoluble organic comonomers such as methyl methacrylate in their compositions while the present invention employs substantially water insoluble organic monomers. These latter monomers are employed in the present invention to obtain cured elastomers with desirable physical strength and resistance to tearing after absorption of water.

SUMMARY OF THE INVENTION

It is one object of this invention to provide a composition curable to a hydrophilic (i.e., advancing water-in-air contact angle of no greater than 80°–85° and more preferably less than 80° at 25° C. after hydration after being cured against a polytetrafluoroethylene substrate) silicone-organic copolymer which is capable of absorbing at least 3% by weight of water based upon the total dry weight of the elastomer. The composition is composed of from 50 to 95 parts by weight of a polydiorganosiloxane polyether block copolymer and from 5 to 50 parts by weight of one or more substantially water insoluble aliphatically unsaturated organic monomers. The block copolymer portion provides gas permeability, flexibility and hydrophilicity while the organic portion derived from the unsaturated monomer provides improved physical properties before and after hydration. When polyether blocks are pendant from a silicon atom present in the polydiorganosiloxane segment of the block copolymer, the terminal end is capped with an aliphatically unsaturated radical for copolymerization with the organic monomer. This results in a copolymer wherein all of the hydrophilic polyether segments are tied into the copolymer network thus contributing to the elastomeric properties of the copolymer in addition to serving to render the copolymer hydrophilic and water absorbing.

It is another object of this invention to provide a hydrophilic, water absorbing silicone-organic copolymer elastomer which is permeable and useful as a membrane for gas and fluid separations. It is also an object of this invention to provide hydrophilic elastomers which are capable of releasing materials such as bioactive agents (e.g., hydrophilic drugs, insecticides and herbicides) at a controlled rate. The release rate can be controlled by the choice of polysiloxane and polyether segments to vary the hydrophilic character of the copolymer elastomer.

This invention provides improved compositions over the compositions described in two U.S. patent applications to Chi-long Lee and Wen-Bin Shyu entitled "Hydrophilic Silicone-Organic Copolymers" (U.S. Ser. No. 06/683,308, now U.S. Pat. No. 4,600,751) and "Aqueous Emulsions Containing Hydrophilic Silicone-Organic Copolymers" (U.S. Ser. No. 06/683,303, now U.S. Pat. No. 4,584,337) which were filed on Dec. 18, 1984 and assigned to the same assignee as is the present invention. Because of the difference in polysiloxane block copolymer structure from the Lee and Shyu compositions, the compositions of the present invention were found to have higher tensile strengths for a given level of methyl methacrylate organic monomer and to be essentially non-cytopathic as will be further described, infra, and may find use in contact with the body such as for use in the controlled delivery of hydrophilic drugs. The Lee and Shyu compositions tested were found to elicit a cytopathic response in testing and are best used for non-body contact purposes.

DETAILED DESCRIPTION OF THE INVENTION

These and other objects of the present invention are provided by a composition curable to a hydrophilic, water absorbing silicone-organic copolymer elastomer consisting essentially of (A) from 50 to 95 parts by weight of a block copolymer of the formula $$R'_{1-f}[ZE(O)CHNQNHC(O)T(C_cH_{2c})]_f(RR'SiO)_a-$$
$$-(RSiO)_b(RR'Si)[(C_cH_{2c})T(O)CHNQNHC(O)EZ]_fR'_{1-f}$$
$$-(C_cH_{2c})T(O)CHNQNHC(O)EZ$$

wherein
Z is $CH_2=CR''COOR'''NHCO-$, $$E \text{ is } -(OCHCH_2)_d(OCH_2CH_2)_eO-$$
$$\quad\quad\quad\quad\quad |$$
$$\quad\quad\quad\quad CH_3$$

Q is a divalent radical obtained by removing the NCO radicals from a diisocyanate selected from the group consisting of aliphatic, cycloaliphatic and aromatic diisocyanates, T is a divalent radical selected from the group consisting of $-NR''-$ and $-O-$ wherein said T is attached to a carbon atom on $-C_cH_{2c}-$ which is at least the third carbon atom away from the silicon atom to which the $-C_cH_{2c}$ radical is attached, a is an integer of from 4 to 49, inclusive,
b is an integer of from 0 to 15, inclusive,
c is an integer having a value of 3 or 4,
d is an integer of from 0 to 25, inclusive,
e is an integer of from 5 to 50 inclusive,
d+e is no greater than 50 and e is greater than or equal to d,
f is 0 or 1,
f' is 0 or 1,
f+f'+b is at least 2,
R is a monovalent hydrocarbon or halohydrocarbon radical of from 1 to 6 inclusive carbon atoms which is free of aliphatic unsaturation,
R' is a methyl or a phenyl radical,
R'' is an alkyl radical of from 1 to 4 inclusive carbon atoms or hydrogen, and
R''' is a divalent hydrocarbon radical of from 2 to 6 inclusive carbon atoms, and (B) from 5 to 50 parts by weight of at least one substantially water insoluble aliphatically unsaturated organic monomer which is compatible with said (A), wherein upon curing said composition, an elastomer is obtained which is hydrophilic and capable of absorbing at least 3% by weight of water based upon the total weight of said elastomer before exposure to water.

This invention also relates to the copolymer elastomers obtained upon curing such compositions and to membranes formed from such copolymer elastomers.

The silicone block copolymers employed in the present invention are preferably produced by first preparing an isocyanate-functional intermediate by reacting a diisocyanate with a polysiloxane of the formula (I):

$$R'_{1-f}[HT(C_cH_{2c})]_f(RR'SiO)_a(RSiO)_b(RR'Si)[(C_cH_{2c})TH]_fR'_{1-f}$$
$$-(C_cH_{2c})TH$$

where T is —NR"— or —O— and the remaining symbols and subscripts are defined above. Preferably, T is —NR"— and, more preferably, c is 4, —$C_cH_{2c}$— is —$CH_2CH(CH_3)CH_2$—, and R" is a methyl radical. Such polysiloxanes are known as can be seen from an examination of U.S. Pat. Nos. 2,924,588 (issued Feb. 9, 1960) and 3,146,250 (issued Aug. 25, 1964), each to Speier.

Any of a number of well-known aliphatic, cycloaliphatic and aromatic diisocyanates can be employed to form such a prepolymer. Examples of diisocyanates are aliphatic diisocyanates such as tetramethylene diisocyanate and hexamethylene diisocyanate, cycloaliphatic isocyanates such as isophorone diisocyanate, cyclohexyl-1,4-diisocyanate, and dicyclohexylmethane-4,4'-diisocyanate and aromatic diisocyanates such as diphenylmethane-4,4'-diisocyanate. Thus, Q as used in the above formula would be —$(CH_2)_6$— for hexamethylene diisocyanate and —$C_6H_4CH_2C_6H_4$— for diphenylmethane-4,4'-diisocyanate. When the cured copolymers of the present invention are intended for use in medical applications such as the controlled release of drugs, it is preferred to employ diisocyanates such as dicyclohexylmethane-4,4'-diisocyanate and diphenylmethane-4,4'-diisocyanate which result in a cured copolymer which, as shown in the following examples, does not elicit a significant degree of cytopathic response in tissue culture or other appropriate testing for bodily contact applications.

The isocyanato-functional prepolymer is prepared under anhydrous conditions in a conventional manner by reacting the above polysiloxne (I) with an amount of the diisocyanate which is preferably the stoichiometric amount needed to completely react with the —OH or =NH radicals present in the polysiloxane (I). A slight excess may be used if some of the reactants contain small amounts of water which may use up some of the isocynate radicals. The reaction must be conducted in the presence of an inert solvent such as anhyrous toluene or tetrahydrofuran (toluene is preferred) when T is —NR"— to reduce the solids content of the mixture and to thereby avoid gelation of the mixture. The reaction can be accelerated by heating the mixture to from 50°-100° C. for 1-4 hours. A catalytic amount of a known condensation catalyst such as an amine (e.g., triethylamine) or a tin catalyst (e.g., dibutyltindilaurate) can also be used to speed up the reaction of the isocyanate radicals with —OH radicals (amine radicals are normally sufficiently reactive with the isocyanate radicals so that no catalyst is typically needed). The free iocyanate content can be monitored by standard titration methods to determine when the formation of the isocyanate-functional prepolymer product is completed. The reaction is prefrably conducted under mild conditions (e.g., room temperature to about 50° C.) when the polysiloxane contains primary amino radicals.

The second step is the reaction of a polyether (polyalkyleneoxy) glycol of the average formula H(OCH(CH$_3$)CH$_2$)$_d$(OCH$_2$CH$_2$)$_e$OH (d and e are defined above) with the isocyanate-functional prepolymer product prepared above to produce a polysiloxane polyether block copolymer prepolymer which contains ≡COH radicals. Polyether glycols of this type are commercially available materials which are sold by, for example, BASF Wyandotte Corporation, Parsippany, NJ 07054 and The Dow Chemical Company, Midland, MI 48640. Examples of such polyether glycols are HO(CH$_2$CH$_2$O)$_e$H where e has an average value of about 5, 13 and 50 and polyols of the formula HO(CH$_2$CH$_2$O)$_e$(CH(CH$_3$)CH$_2$O)$_d$H where d and e both have an average of about 24. To prepare the polysiloxane polyether block copolymer perpolymers, a sufficient amount of the desired polyether polyol is added to the isocyanate-functional prepolymer to provide the stoichiometric amount of polyether polyol needed to react one of the two ≡COH radicals present in that polyol with the isocyanate radicals present in the isocyanate-functional prepolymer. A slight excess of polyol may be used to insure that all of the isocyanate radicals are removed to avoid possible cytopathic effects in the cured product caused by such radicals. The reaction is conducted under anhydrous conditions in the presence of a inert solvent as noted above and a catalytic amount of a condensation catalyst such as dibutyltindilaurate (0.00005% tin based on the total amount of polyalkylene glycol was used with good results) if a catalyst was not added when the prepolymer was prepared. The formation of the polysiloxane polyether block copolymer prepolymer is preferably conducted by heating the reactants at 50°-100° C. for 1-2 hours. Reaction is continued until the free isocyanate content of the block copolymer prepolymer is substantially nil. It is recognized that it is possible that both hydroxyl radicals of the polyether polyol can react with isocyanate radicals to form chain-extended polysiloxane polyether block copolymer prepolymers, but it is believed that the amount of such a reaction will be small. Such chain-extended polymers should contribute to the wettability and water absorptivity of the cured elastomeric silicone/organic copolymers of the present invention and will not detract greatly from the desired properties of the cured elastomers of the present invention.

The third step used to prepare the terminally aliphatically unsaturated block copolymers employed in the present invention for reaction with the hereinafter described organic monomers is one which preferably involves reacting the polysiloxane polyether block copolymer prepolymers made above which are substantially composed of prepolymers of the formula

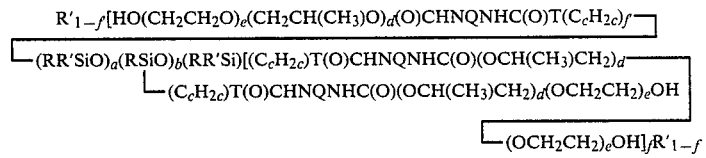

with, preferably, a stoichiometric amount of aliphatically unsaturated isocyanate-functional compound of the formula CH$_2$=CR"COOR"' NCO to produce a block copolymer wherein R" can be methyl, ethyl, propyl, butyl or hydrogen and is preferably a methyl radical and R"' is an alkylene radical of from 2 to 6 inclusive carbon atoms such as ethylene, propylene, butylene and hexylene with ethylene being preferred. Examples of aliphatically unsaturated compounds useful for reaction with the prepolymers are isocyanatoethyl methacrylate and isocyanatoethyl acrylate (CH₂=CHCOO(CH₂)₂NCO). The isocyanate compounds provide a one step addition to the block copolymer prepolymers under mild reaction conditions in the presence of a catalyst such as an organotin catalyst or an amine without generating by-products. 0.3% of triethylamine based upon the total amount of block copolymer prepolymer and isocyanate compound was found to work well with the above block copolymer prepolymers and isocyanatoethyl methacrylate. Most preferred is isocyanotoethyl methacrylate. Since the acrylate radicals are reactive, a small amount of an inhibitor such as hydroquinone (0.00003% based on the amount of aliphatically unsaturated isocyanate-functional compound) must be added along with the catalyst to prevent premature reaction with the acrylate radicals. After the reaction with the isocyanate-functional compound is complete, the solvent is preferably stripped at relatively low temperature (e.g. less than 50° C.) under vacuum conditions from the product to obtain a silicone polyether block copolymer useful in the present invention. Use of infrared spectrograms (i.e., follow loss of isocyanate peak) of reaction mixtures or other known techniques such as titration methods to determine when each reaction involving isocyanates is complete is preferred. It is well known that block copolymers are typically a mixture of block copolymers of varying chain lengths having the previously described structure. The overall block copolymer composition is typically described as one wherein the average chain length of segments such as polyethyleneoxy units in the block copolymer composition is referred to by an integer such as "e is an integer from 5 to 50" in the foregoing formula. The block copolymers of the present invention also contain substituted siloxy units (designated by the subscripts "a" and "b" which may be in discrete blocks of, e.g., several (RR'SiO) units or may contain (RR'SiO) units interspersed with

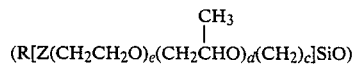

units along the same linear polysiloxane chain.

As can be seen from the foregoing formulas, each R can be a hydrocarbon or a halohydrocarbon radical from 1 to 6 inclusive carbon atoms which is free of aliphatic unsaturation such as methyl, ethyl, propyl, hexyl, cyclohexyl, chloromethyl, 3,3,3-trifluoropropyl or 1,1,1-trifluorohexyl radicals. Preferably R is selected from the group consisting of methyl, phenyl and 3,3,3-trifluoropropyl radicals. For highest permeability to gases such as oxygen, R and R' are most preferably methyl radicals.

To obtain a hydrophylic, water-absorbing silicone-organic copolymer elastomer, the block copolymer must contain a sufficient amount of hydrophilic ether (alkyleneoxy) units to overcome the hydrophilic character contributed by the polysiloxane segments and by the organic polymer segments derived from the unsaturated monomers. A polysiloxane segment consisting of about 50 siloxy units which does not contain hydrophilic polyether segments is about the maximum which can be present and still obtain a hydrophilic surface having an advancing water-in-air contact angle of no greater than about 80°–85° at 25° C. when molded against polytetrafluoroethylene. This is particularly true when the block copolymer contains only two terminal polyether chains which is a preferred block copolymer (i.e., b=0). To obtain the best elastomeric properties, it is preferred that a block copolymer be employed wherein a is an integer of from 8 to 14 inclusive, and e is an integer of from 10 to 15 inclusive. Since the ethyleneoxy —OCH₂CH₂— unit is more hydrophilic than the propyleneoxy

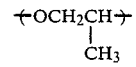

unit, the ratio of these units in the chain can be varied to modify the hydrophilicity and water absorption of the elastomer. If more than one half of the alkyleneoxy units present in the polyether segment are propyleneoxy units, the hydrophilicity of the elastomer may be compromised. For this reason, it is best that d be no greater than 25 and that the value of e be greater than or equal to d. Preferably, d=0 and the hydrophilicity and water absorption of the elastomer is varied by controlling the number and ratio of ethyleneoxy units to RR'SiO units in the polydiorganosiloxane segments. The polyether segments should not consist of more than 50 alkyleneoxy units, (i.e., the sum of d+e should be no greater than 50).

The permeability of the elastomer can also be controlled by varying the number and ratio of alkyleneoxy units to RR'SiO units. Block copolymers wherein b has a value of greater than 2 will tend to form more tightly cross-linked, less elastomeric copolymers than block copolymers wherein f+f'+b=2. It is best to minimize the amount of block copolymers wherein f+f'+b is greater than 2 in the composition to obtain the best elastomeric properties, particularly elongation values. The gas permeability of the cured elastomer begins to rapidly decrease for a given ratio of block copolymer to organic monomer as the siloxane unit content of the block copolymer is decreased. 50 parts of block copolymer per 100 parts total block copolymer and organic monomer appears to be about the minimum necessary to retain a reasonable amount of gas permeability. When the block copolymer content of the elastomer is increased to about 95 parts, the physical properties of the cured elastomer tend to become poor. The water absorption of the elastomer should be at least 3% by weight of water based upon the total weight of the dry cured elastomer before exposure to water. The water absorption of the cured elastomer will be dependent upon the polyalkyleneoxy content of the block copolymer. An increase in polyalkyleneoxy content of the block will generally increase the water absorption of the cured elastomer for a given ratio of block copolymer and organic monomer.

The block copolymers employed in the present invention differ from the materials described in the aforementioned Lee and Shyu patent applications and from the aforementioned Mueller, et al. U.S. Patent and European Patent Application because of their structure. When T is —NR''—, there is one urea and at least two urethane linkages between the silicon atom and the terminal acrylate- or methacrylate-functional radical. When T is —O—, there are at least three urethane linkages between the silicon atom and the terminal acrylate- or methacrylate-functional radical. The terminal acrylate or methacrylate radical is isocyanate-functional and therefore reacts directly with the ≡COH present in the block copolymer prepolymer and therefore avoids the necessity for the preparation of another isocyanate-functional prepolymer after a hydroxyl radical terminated block copolymer is prepared. In such a case, Mueller, et al. would require a diisocyanate to link a material such as a hydroxy-functional acrylate (e.g., 2-hydroxyethyl methacrylate) with $\equiv$COH radicals on the block copolymer to provide terminal methacrylate-functional radicals. Furthermore, the Mueller, et al. patent and patent publication do not teach use of a linkage formed by a diisocyanate between the silicon atom and the polyalkyleneoxy polyether block attached to the silicon atom. It is this linkage which also differentiates the block copolymers used in the compositions of the present invention from those described in the aforementioned Lee and Shyu patent applications. By preparing the block copolymers in this manner rather than using the platinum-catalyzed addition of an allyl radical terminated polyalkyleneoxy alcohol (e.g., $CH_2=CHCH_2(OCH_2CH_2)_eOH$ where e is 12-14) to $\equiv$SiH described in the Lee and Shyu patent applications, it was found that the cured elastomeric products of the present invention were substantially free of cytopathic response in the tissue culture test described in the following examples. It was also found that the cured hydrophilic elastomeric products of the present invention generally possessed higher tensile strengths than similar copolymers of the Lee and Shyu type and still retained at least one-third and generally approximately one half of their original tensile strength after absorbing water.

The block copolymers are copolymerized with from 5 to 50 parts by weight of at least one substantially water insoluble aliphatically unsaturated organic monomer which is compatible with the block copolymer. The term "compatible" is intended to mean that the block copolymer and organic monomer are sufficiently miscible and free radical polymerizable with each other that they are capable of forming a substantially cross-linked copolymer rather than being substantially a mixture of two homopolymers. A copolymer provides better physical properties. By "substantially water insoluble", it is meant that the monomer does not contain free hydroxyl radicals, polyalkyleneoxy radicals, carboxyl radicals, amine radicals or other radicals which by themselves or as salts render the monomer water soluble. Examples of water soluble monomers are 2-hydroxyethylmetharcrylate and N-vinyl pyrrolidone. Examples of monomers which are substantially water insoluble include the hydrocarbon esters of acrylic and methacrylate acid such as methyl acrylate, methyl methacrylate, ethyl acrylate, butyl acrylate and cyclohexyl methacrylate, styrene, alphamethylstyrene, para-methylstyrene, vinyl acetate, vinyl propionate, allyl ether, and acrylonitrile. Preferably, such monomers are of the formula

wherein W is selected from the group consisting of —COOR"", —OOCCH$_3$ and —C$_6$H$_5$ wherein R"" is an alkyl radical of from 1 to 6 inclusive carbon atoms such as methyl methacrylate, methyl acrylate, vinyl acetate and styrene. Methyl methacrylate is preferred. When higher tensile strength and tear resistant hydrophilic elastomers are desired such as for use as for example, membranes, it is preferable that from 30 to 50 parts by weight of the total weight of block copolymers and substantially water insoluble aliphatically unsaturated organic monomers present in the composition be such organic monomers. When higher levels of organic monomer (e.g. about 50% monomer based on the total amount of acrylate or methacrylate terminated block copolymer and monomer) are employed, the compositions tend to have low viscosities and are more difficult to mold in thin films.

The block copolymer and organic monomers are homogeneously blended together to form a composition which is then cured to a hydrophilic elastomer by exposing the composition to free radical polymerization conditions. Thus, the compositions can be cured by exposing them to heat, ultraviolet radiation, electron beam radiation, or other forms of ionizing radiation. If ultraviolet radiation is employed, it can be desirable to include an effective amount of a photoinitiator such as benzophenone with or without a promoter such as an amine such as dimethyl aniline in the composition before curing.

Free radical polymerization can also be inititated by further including from 0.1 to 10 parts by weight of a free radical initiator per 100 parts by weight of block copolymers and organic monomers in the composition. 0.36 parts of 2,2-azo-bis-isobutyronitrile initiator per 100 parts of block copolymer and organic monomer was found to work well as shown in Examples 4–6. The composition containing a free radical initiator can then be cured by heating the composition to a temperature which is sufficient to initiate production of free radicals or else simply by quickly adding the free radical initiator if it produces free radicals at room temperature. Examples of useful free radical initiators are peroxides such as 2,5-bis-(t-butylperoxy)-2,5-dimethyl hexane, tert-butyl peroxy-2-ethylhexanoate (also known as "tert-butyl peroctoate"), benzoyl peroxide, methyl ethyl ketone peroxide and azo compounds such as 2,2-azo-bis-isobutyronitrile and 2,2'-azo-bis-(2,4-dimethylvaleronitrile). Because the organic monomers tend to be volatile, it is best to at least initially cure the compositions at temperatures which are no greater than about 200° C., and preferably no greater than 100° C., and under conditions which tend to inhibit escape of the unreacted monomer such as in a closed mold. Post curing at higher temperatures may be accomplished after the initial cure since most of the volatile organic monomers should have been copolymerized in the initial curing step. Heat/press cures at 60° C. for 15 minutes and then 15 minutes at 100° C. followed by a postcure at 80° C. for at least 12 hours produced acceptable cured elastomers (2,2-azo-bis-isobutyronitrile was used as a catalyst) as shown in the following Examples.

Nonreactive solvents can be added to reduce the viscosity of the compositions, but it is best to rely on the organic monomers to reduce the viscosity of the compositions. Aqueous emulsions formed from the curable compositions of the present invention can be prepared by adding suitable emulsifiers to the compositions. Emulsions can be prepared in the same manner as is described in the U.S. patent application entitled "Aqueous Emulsions Containing Hydrophilic Silicone-Organic Copolymers" (U.S. Ser. No. 06/683,303, now U.S. Pat. No. 4,584,337) filed on Dec. 18, 1984 in the names of Chi-long Lee and Wen-Bin Shyu and assigned to the same assignee as is the present invention.

The term "consisting essentially of" as used in this Specification and the accompanying claims is intended to mean that the combination of block copolymers and substantially water insoluble organic polymers to provide hydrophilic, water-absorbing silicone-organic copolymer elastomers forms the basis for the present invention. If desired, other additional ingredients which do not affect the hydrophilic, water absorbing character of the cured elastomers can be added to the aforementioned compositions. Examples of such additional ingredients can be silica and other fillers, fiber reinforcement, antioxidants, pigments, dyes and colorants and the like.

Because the permeability and the water absorption of the cured elastomers can be varied, the cured elastomers are suitable as selectively permeable membranes useful, for example, in gas or fluid separations such as in separating oxygen from nitrogen or for altering the ratio of water to methanol in water/methanol mixtures. Likewise, bioactive agents such as insecticides, larvicides, acaricides and herbicides or fertilizers could be incorporated within the curable compositions of the present invention and the compositions can then be cured to form hydrophilic, water absorptive elastomers capable of releasing the agents included therein over a period of time which is dependent upon the composition of the elastomer. After conducting appropriate safety and efficacy testing for the compositions selected, cured elastomers of the present invention may find use in applications involving contact with the human body such as for the controlled delivery of drugs by incorporating the drug into the compositions of the present invention and curing the mixture or by using a membrane of the cured elastomer to control delivery of the drug from a reservoir. Some of the elastomers were optically clear after hydration and can find use in applications where transparent elastomers are required such as coatings for glass or for fabric treatments.

In the following Examples, the advancing water-in-air contact angles were measured using a sessile drop method at room temperature (about 21±2° C.) on dry (unhydrated) samples of the cured elastomer using a distilled water drop. The elastomer was molded against TEFLON ® polytetrafluoroethylene film in a molding chase. The measurement was completed within about 5-10 minutes from the application of the water drop to the elastomer. The instrument used was a NRL Contact Angle Goniometer, Model No. A-100 which is a product of Rame-Hart, Inc., Mountain Lake, N.J. The contact angles were also measured using $CH_2I_2$.

The percent water absorption of the cured elastomer products was measured by molding a slab of cured elastomer product (weight about 1 g, thickness 0.03 or 0.06 inches). The dry slab was then either totally immersed in distilled water or placed in a dessicator above, but not in physical contact with, a saturated sodium bisulfate solution to provide a 50% relative humidity atmosphere at room temperature for the period of time described in the following examples. The percent water absorption reported was calculated as follows:

$$\frac{W_H - W_U}{W_U} \times 100 = \text{percent water absorption}$$

where $W_H$ is the weight of the slab after hydration and $W_U$ is the dry (unhydrated) weight of the slab.

The physical properties of the cured elastomers were measured on unhydrated and hydrated samples as indicated in the Examples using the following ASTM Methods: ASTM D412—ultimate tensile strength (tensile stress) and elongation at break; ASTM D624—tear (Die B) and ASTM D2240—durometer (Shore A). The physical properties reported are the average properties of at least 3 samples.

The permeability of water vapor through an approximately 30 mil (0.76 mm) thick dry (unhydrated) membrane formed of the cured elastomer products reported in the Examples was determined at room temperature according to the procedure described in ASTM D-1653 using a Payne Permeability Cup, purchased from Fisher Scientific Co, 711 Forbes Avenue, Pittsburgh, PA 15219. The wate vapor permeability was calculated from the loss of water through the cured elastomer membrane at room temperature. The liquid being measured was placed in the bottom of the Payne Permeability Cup and was not in actual contact with the membrane being tested. In the Examples, $P_{H_2O}$ is permeability to water vapor in units of $$\left[ \frac{\text{milligrams of permeant} \cdot \text{thickness of elastomer in millimeters.}}{\text{area of membrane in cm}^2 \cdot 24 \text{ hour period}} \right]$$

The following Examples are illustrative only and should not be construed as limiting the invention which is properly delineated in the appended claims.

Unless otherwise mentioned, all parts and percentages relating to compositions are by weight.

EXAMPLES 1-3

An amino-functional polydimethylsiloxane of the general formula

was prepared where "Me" in this and the following Examples is a methyl radical. This material (hereinafter "Polymer A") was made by equilibration of a mixture of low molecular weight polydimethylcyclosiloxane predominantly composed of octamethylcyclotetrasiloxane and

in the presence of water and a small amount of potassium hydroxide catalyst and had an amine equivalent (by titration with perchloric acid in acetic acid using a Methyl Violet indicator) of 684 which corresponds to a number average molecular weight for the amino-functional polysiloxane of about 2×684 or 1368. Thus, a in the above formula would have an average value of about 15.4.

76.5 milliliters (81.8 g) of dicyclohexylmethane-4,4'-diisocyanate (0.62 molar equivalents of isocyanate radicals) and 300 ml of anhydrous toluene was added to a dried (moisture-free) 3 liter, 3-necked, round-bottomed flask equipped with an additional funnel, air-powered stirrer, a air-cooled condenser, a temperature controller for controlling a heating mantle and a dry nitrogen source to maintain the interior of the flask under a nitrogen atmosphere. The flask was filled with nitrogen gas before addition of the diisocyanate solution. The stirrer was started and a solution of 212 g of Polymer A (0.31 molar equivalents of =NH radicals) in 800 ml of anhydrous toluene was added to the contents of the flask via the addition funnel over about a 15 minute period. 380.4 g of a dry solution of a polyoxyethylene glycol (hereinafter "Polyol A") having a number average molecular weight of about 600 (Polyglycol E600 from The Dow Chemical Company, Midland, Mich. 48640) in toluene (calculated to contain 210 g of Polyol A which corresponded to about 0.62 molar equivalents of ≡COH radicals) and 0.2 mol of a 10 percent (weight/weight solution of dibutyltindilaurate in dry toluene was then added to the contents of the flask. The addition funnel was washed with 200 ml of dry toluene which was allowed to enter the flask. The stirring contents of the flask were heated to 100° C. and held at 100° C. for 1 hour. The heating mantle was shut off and the contents of the flask were allowed to stir without any further heating overnight.

The next day, 50 milligrams of hydroquinone and 1.8 g of triethylamine were stirred into the contents of the flask. With the stirring on and the contents of the flask under a nitrogen blanket, 96.1 g of isocyanatoethylmethacrylate (0.62 molar equivalents of isocyanate radicals) was added to the contents of the flask through the addition funnel and the funnel was then washed with 118 ml of dry toluene which was allowed to drop into the contents of the flask. The contents of the flask were allowed to stir for 1 hour at room temperature and was then heated to and kept at 50° C. for 3 hours. The toluene was then stripped from the contents of the flask under vacuum at 30° C. for 16 hours to give a theoretical yield of 600 g of a glassy silicone block copolymer ("Silicone Block Copolymer A") substantially having the average formula

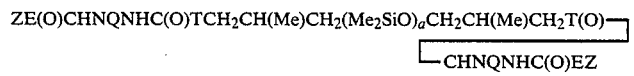

where Z is $CH_2=C(Me)COOCH_2CH_2NHC(O)—$, E is $—(OCH_2CH_2)_eO—$ where e has an average value of about 13,

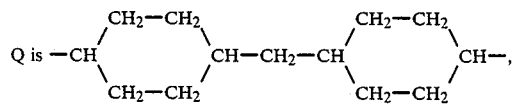

T is $—N(Me)—$ and a has an average value of about 15.

To produce the composition of Example 1, 66.7 g of methylmethacrylate monomer was added to the contents of the flask and stirred until homogeneous. 275 g of this solution was removed from the flask as the composition of Example 1 which was intended to contain 90% Silicone Block Copolymer A and 10% methylmethacrylate monomer.

The composition of Example 2 was made by adding 48.9 g of methylmethacrylate monomer to the material remaining in the flask and stirring until homogeneous. 275 g of the contents of the flask were removed from the flask as the composition of Example 2 which was intended to contain 80% Silicone Block Copolymer A and 20% methylmethacrylate monomer.

Finally, 98.9 g of methylmethacrylate monomer was added to the material remaining in the flask and it was stirred until homogeneous. The contents of the flask contained the composition of Example 3 which was intended to contain 50% Silicone Block Copolymer A and 50% methylmethacrylate monomer.

It was later discovered that a calculation error had been made and twice the stoichiometric amount of isocyanatoethylmethacrylate was used in preparing Examples 1-3. The excess isocyanotoethylmethacrylate was not thought to be removed during stripping and was thought to coreact with the methylmethacrylate and Polymer A during cure of each composition. Therefore, the composition of Example 1 was believed to contain about 7 weight percent of coreacted isocyanotoethylmethacrylate in addition to the other two ingredients. Similarly Examples 2 and 3 were believed to contain about 6 and 4 weight percent, respectively, of coreacted isocyanotoethylmethacrylate in addition to the other two ingredients. Examples 8-10 were prepared to show the use of a stoichiometric amount of isocyanotoethylmethacrylate.

2.0 g of a free radical curing catalyst, 2,2-azo-bis-isobutyronitrile, was added to each composition and mixed 30 minutes by rolling a bottle of each sample for 30 minutes. The catalyst readily dissolved in Example 3, but was not completely dissolved in Example 1 even after several days. The excess catalyst in Example 1 was allowed to settle to the bottom overnight and the composition above the settled solids was used to make cured elastomers the next day.

All molded samples made from the catalyzed compositions of Examples 1-3 were prepared by curing each catalyzed composition in a molding chase under about 20,000 p.s.i. of pressure for 15 minutes at 60° C. (to reduce loss of volatile monomer) followed by 15 minutes at 100° C. Example 3 was somewhat difficult to mold because the viscosity of the mixture was low. The molded samples were then postcured in an oven for a minimum of 12 hours at 80° C. The cured samples were then devolatilized a minimum of 2 hours in a vacuum oven at 80° C. and 1 Torr pressure to remove any volatiles such as unreacted organic monomer. It was noted that the molded elastomer samples turned yellow if the oven temperature exceeded 100° C. Examples 1 and 2 resulted in visually optically clear elastomers while those of Example 3 were clear, but had a bluish tint.

The physical properties obtained on dry (0% relative humidity, anhydrous) samples and those obtained after soaking cured samples in distilled water for 5 days at room temperature are reported in Table I. The advancing water-in-air and $CH_2I_2$-in-air contact angles of the cured elastomers (dry) is also reported in Table I. The percent water absorption of each cured dry sample was measured in two ways: by an increase in sample weight (a) after a 24 hour immersion in distilled water and (b) after 24 hours at 50% relative humidity (stored in a dessicator above, but not in contact with, a saturated solution of sodium bisulfate), both at room temperature. Finally, the water vapor permeability measured on a membrane of each cured composition is reported in Table I.

EXAMPLES 4-6

The compositions of Examples 4-6 were made in a manner similar to that used in Examples 1-3, but an aromatic diisocyanate was used in the preparation of the silicone block copolymer.

Thus, 77.5 g of diphenylmethane-4,4'-diisocyanate (0.62 molar equivalents of isocyanate radicals) was dissolved in 500 ml of dry toluene under a nitrogen blanket in a flask of the type used in Examples 1-3. The contents of the flask had to be heated to 50° C. to dissolve the diisocyanate. The heating mantle was shut off and 212 g of Polymer A (0.31 equivalents of ≡NH radicals) was dissolved in 600 ml of dry toluene, placed in the addition funnel and added to the stirring contents of the flask dropwise over a period of about 1.5 hours. The contents of the flask were not externally heated during this addition. When this addition was complete, 380.4 g of the same solution of polyethyleneoxy glycol/toluene solution used in Examples 1-3 was added to the addition funnel and was then rapidly added to the stirring contents of the flask. The addition funnel was washed with 100 ml of dry toluene which was then added to the contents of the flask. The contents of the flask were heated to 100° C., held at that temperature for 1 hour, and then cooled to room temperature.

Then 50 milligrams of hydroquinone and 1.8 g of triethylamine were added to the stirring contents of the flask followed by 96.1 g of isocyanatoethylmethacrylate. Finally, 200 microliters of a 10% by weight solution of dibutyltindilaurate in dry toluene was added to the contents of the flask and the contents were allowed to stir overnight at room temperature to complete production of the silicone block copolymer.

The next day, the toluene was stripped from the contents of the flask under vacuum conditions (about 1 Torr) at 35°–40° C. for 6 hours (until no more bubbles formed). The theoretical weight of the material in the flask was 595.6 g. The silicone block copolymer in the flask ("Silicone Block Copolymer B") substantially had the average formula:

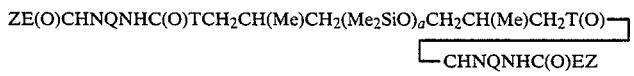

ZE(O)CHNQNHC(O)TCH$_2$CH(Me)CH$_2$(Me$_2$SiO)$_a$CH$_2$CH(Me)CH$_2$T(O)—
└─CHNQNHC(O)EZ where Z is CH$_2$=C(Me)COOCH$_2$CH$_2$NHC(O)—, E is —(OCH$_2$CH$_2$)$_e$O— where e has an average value of about 13, Q is —C$_6$H$_4$—CH$_2$—C$_6$H$_4$—, T is —N(Me)— and a has an average value of about 15.4.

The composition of Example 4 was made by adding 66.2 g of methylmethacrylate monomer to the contents of the flask and stirring until homogeneous. 274 g of the contents were withdrawn as the composition of Example 4 which was intended to contain 90% Silicone Block Copolymer B and 10% methylmethacrylate monomer.

The composition of Example 5 was made by adding 48.5 g of methylmethacrylate monomers to the material remaining in the flask and stirring until homogeneous. 274 g of the contents of the flask were removed as the composition of Example 5 which was intended to contain 80% Silicone Block Copolymer B and 20% methylmethacrylate monomer.

Finally, 97.4 g of methylmethacrylate monomer was added to the material remaining in the flask and it was stirred until homogeneous. The contents of the flask contained the composition of Example 6 which was intended to contain 50% of Silicone Block Copolymer B and 50% of methylmethacrylate monomer.

It was later discovered that a calculation error had been made and twice the stoichiometric amount of isocyanatoethylmethacrylate was used in preparing Examples 4-6. The excess isocyanotoethylmethacrylate was not thought to be removed during stripping and was thought to coreact with the methylmethacrylate and Polymer A during cure of each composition. Therefore, the composition of Example 4 was believed to contain about 7 weight percent of coreacted isocyanotoethylmethacrylate in addition to the other two ingredients. Similarly Examples 5 and 6 were believed to contain about 6 and 4 weight percent, respectively, of coreacted isocyanotoethylmethacrylate in addition to the other two ingredients.

Since 2 g of 2,2-azo-bis-isobutyronitrile catalyst was not completely soluble in Example 1, only 1 g of that catalyst was added to each composition of Example 4-6 and each sample was allowed to stand overnight at room temperature to permit the catalyst to dissolve. Cured elastomers were prepared from the catalyzed compositions in the same manner as was described for Examples 1-3. The same tests were run on the cured elastomers Examples 4-6 as for Examples 1-3 and the results are reported in Table I.

Referring to Table I, the cured compositions were stiff elastomers (durometer of 78-92) which exhibited relatively high dry tensile and tear strengths at break when dry. Tensile strength increased markedly when the level of methylmethacrylate was increased. Except for Example 5 which retained 30% of its original tensile strength after being hydrated, the remaining cured elastomers retained between 40-63% of their dry tensile strength value. Tear strengths for the dry samples were also very good. The cured samples also retained at least 40% of their original dry elongation at break value.

The advancing water-in-air contact angle of the dry samples all showed that they were hydrophilic (contact angle of less than 80°) and generally tended to become lower the longer the water droplet was allowed to stand on the surface of the sample. The advancing CH$_2$I$_2$-in-air contact angle (a polar compound) decreased with increasing methylmethacrylate content for Examples 1-3, but was not consistent for Examples 4-6. These contact angles generally followed the trends set by the water contact angles observed.

The water absorption of the cured samples decreased with increasing methylmethacrylate content as did the permeability of the sample to water (P$_{H2O}$). The cured compositions of Examples 2 and 5 were hydrophilic materials which had a good balance of tensile (dry and hydrated) and tear strength coupled with 19% and 15% water absorption and relatively good permeation to water vapor, a polar compound. It is expected that one way which the permeability of the cured compositions to other polar compounds could be altered is by varying the ratio of the silicone block copolymer to methylmethacrylate used in the compositions employed in these Examples.

The cured compositions of Examples 1-6 were tested, in vitro, by placing duplicate samples of the cured elastomer and extracts from the cured elastomer in direct contact with a confluent monolayer of human embryonic foreskin cells (type HR 218) and each was incubated at 37° in a humidified 5% carbon dioxide atmosphere for 24 hours. After incubation for 24 hours, the cytopathic effect of the direct contact samples and their extracts were each microscopically evaluated against both a positive and a negative control. No cytopathic effect was deemed to be produced by the materials tested or their extracts. It was noted that one of the two samples of the cured composition of Example 6 produced a very slight cytopathic response. This level was deemed to be a marginal response: because neither the other sample in direct contact nor the two extracts for this sample exhibited a response, the test was deemed to be passed (i.e., no cytopathic effect in this test). The Lee and Shyu cured elastomer mentioned, (See Example 8 of "Hydrophilic Silicone-Organic Copolymer Elastomers" to Lee, et al.) exhibited a cytopathic effect in this type of test. These materials appear to show promise for use in applications involving contact with the body after further appropriate testing confirms the results of this screening testing.

for 2 hours. Then, 3 milligrams of hydroquinone (dissolved in tetrahydrofuran solvent) was added to the contents of the flask followed by 8.6 g (0.057 molar equivalents of isocyanate radicals—a 55.7% molar equivalent excess) of isocyanatoethylmethacrylate. The use of an inhibitor such as hydroquinone (to prevent premature reaction of the methacrylate radicals) was necessary because a batch made in a manner similar to this one gelled three hours after addition of the isocyanotoethylmethacrylate was made. The isocyanotoethylmethacrylate was allowed to react for 2 hours at 50°–55° C.

To render any remaining isocyanate radicals inactive, 2.2 g (0.03 moles) of n-butylamine was added to the contents of the flask and allowed to react for 20 minutes at 50°–55° C. The tetrahydrofuran and any excess vola-

TABLE I

| Ex. # | Dry Samples, 0% R.H.[1] | | | | Hydrated Samples[6] | | Advancing Contact Angle (°) | | Water Absorption 24 hours, Wt. % | | $P_{H_2O}$[8] |
|---|---|---|---|---|---|---|---|---|---|---|---|
| | Tensile[2] | Elong.[3] | Durom.[4] | Tear[5] | Tensile[2] | Elong.[3] | $H_2O$ | $CH_2I_2$ | IMMERS.[7] | 50% R.H.[1] | |
| 1 | 620/4.27 | 46 | 78 | 37/6.5 | 390/2.69 | 20 | 67 | 67 | 22.0 | 1.5 | 12.9 |
| 2 | 1500/10.34 | 60 | 82 | 130/22.8 | 610/4.21 | 28 | 65 | 64 | 18.6 | 1.3 | 10.4 |
| 3 | 3430/23.65 | 38 | 90 | 260/45.5 | 2170/15.0 | 47 | 68 | 58 | 7.2 | 0.8 | 2.4 |
| 4 | 810/5.58 | 45 | 79 | 52/9.1 | 350/2.41 | 26 | 70 | 50 | 17.8 | 1.4 | 9.5 |
| 5 | 1890/13.0 | 61 | 88 | 150/26.3 | 570/3.93 | 41 | 73 | 61 | 14.9 | 1.1 | 6.2 |
| 6 | 3820/26.3 | 61 | 92 | 610/106.8 | 1830/12.6 | 47 | 64 | 52 | 5.0 | 0.6 | 2.1 |

[1] R.H. = Relative Humidity
[2] Tensile strength at break in p.s.i./megapascals (MPa)
[3] Elongation at break in %
[4] Shore A durometer value in points.
[5] Tear strength, die B, in pounds per linear inch (p.l.i.)/kilonewtons per meter (KN/m) where 1,000 p.l.i. = 175 kN/m.
[6] Immersed in distilled water for 5 days at room temperature before testing.
[7] Immersed in distilled water for 24 hours at room temperature before testing.
[8] Water vapor permeability in units of (mg $H_2O$) (mm)/(cm$^2$) (24 hr).

EXAMPLE 7

An amino-functional polydimethylsiloxane was made in manner similar to that of polymer A to obtain "Polymer B" which had an amine equivalent (by titration with perchloric acid in acetic acid using a Methyl Violet indicator) of 681 which corresponds to a number average molecular weight of about 2×681 or 1362. This polymer was derivitized with acetic anhydride and stripped at 110° C. (1 Torr pressure) overnight. The stripped product was found to have a number average molecular weight of 1315 via a gel permeation chromatographic method.

To prepare a silicone block copolymer, 8 g of diphenylmethane-4,4'-diisocyanate (0.064 molar equivalents of isocyanate radicals) were added to a flask under a nitrogen gas blanket as in Examples 1–3 along with 62.5 ml of tetrahydrofuran solvent. 20 g of Polymer B (0.0294 molar equivalents of =NH radicals) was dissolved in another 62.5 ml of tetrahydrofuran and the solution was added to the addition funnel. The solution was added to the stirring contents of the flask over about a 15 minute period of time at 25° C. After 30 minutes, the contents of the flask was clear. Then 23.4 g (0.070 molar equivalent of =COH) of the same polyethylenoxy glycol (neat) used in Examples 1–6 was added to the contents of the flask and the contents became hazy. 23 microliters of a 10% solution of dibutyltindilaurate in diethyleneglycol diethylether was added to the stirring contents of the flask and the contents were heated to 50°–55° C. and held at that temperature tile materials such as n-butylamine was stripped from the contents of the flask under full vacuum ( about 1 Torr pressure) at 25° C. to obtain a white pasty silicone block polymer ("Silicone Block Copolymer C"). In this Example, Silicone Block Copolymer C was prepared through the use of molar excesses of diisocyanate, polyol and monoisocyanate. It is an alternative, but currently less preferred, procedure.

Then, 30 g of methylmethacrylate monomomer was added to the Silicone Block Copolymer C in the flask and stirred well to form a white dispersion to which 0.8 g of 2,2-azo-bis-isobutyronitrile was added. The contents of the flask were stirred well and deaired (to remove air bubbles) by subjecting the contents of the flask to a vacuum (about 1 Torr pressure) for 10–20 minutes. The catalyzed composition was stored in a refrigerator until portions of it were cured into 10–20 mil (0.254–0.508 mm) thick membranes between two polytetrafluoroethylene release sheets and into test slabs for physical property and toxicology testing the next day. The portions were heat-press cured (about 15,000 p.s.i. pressure) at 70°–90° C. for 30 minutes. Before curing, the composition contained a ratio 67 parts of Silicone Block Copolymer C to 33 parts methylmethacrylate monomer along with the excess isocyanatoethylmethacrylate/n-butylamine reaction product.

The dry (unhydrated) cured elastomer of this Example 7 had a tensile strength 1570 p.s.i. (10.8 MPa) and an elongation at break of 200%. After 7 days immersion in distilled water at room temperature, the cured elastomer had a tensile strength of 1,000 p.s.i. (6.9 MPa) and thus retained about 64% of its original tensile strength after being hydrated.

Samples of the cured elastomer of Example 7 were tested, in vitro, for cytopathic effect (direct contact and extract) as described for Examples 1–6. In direct contact (after extraction) the cured elastomer was rated as having no cytopathic effect. The extract from the cured elastomer was rated as having a cytopathic effect. In view of the testing results in Examples 4–6, it was thought that a contaminant such as n-butylamine or excess isocyanate compound might have accounted for this result. Thus, the procedure of Examples 4–6 is preferred when materials free from cytopathic effects are desired. Extraction to remove unwanted by-products may also be desirable.

EXAMPLES 8–10

Since an excess of isocyanatoethylmethacrylate was used Examples 1–6 and the excess isocyanate radicals were not removed by reaction with n-butylamine as in Example 7, Examples 8–10 were run to demonstrate the use of a stoichiometric amount of isocyanatoethylmethacrylate and thus essentially repeated Examples 1–3. It was thought that the presence of the excess isocyanatoethylmethacrylate in Examples 1–6 might result in the formation of a hydrophilic radical when the free isocyanate radicals were exposed to atmospheric moisture or when the cured elastomer was placed in water and thus alter the water absorption and/or hydrophilicity of the samples.

An amino-functional polydimethylsiloxane was made in the same general manner as Polymer A of Example 1 to produce "Polymer C" which had an amine equivalent of 577 which corresponds to a number average molecular weight of $2 \times 577$ or 1154 (i.e., the average value of the subscript "a" in the formula is about 12.5). Polymer C thus contained a lower amount of hydrophobic polydimethylsiloxane content than did Polymer A.

"Silicone Block Copolymer D" was prepared in the same general manner as Silicone Block Copolymer A by adding 106 g of dicyclohexylmethane-4,4'-diisocyanate (0.795 molar equivalents of isocyanate radicals) to a dried 2 liter flask of the type used and as equipped in Examples 1–3 containing a dry nitrogen gas atmosphere. The stirrer was started and a solution of 230 g of Polymer C (0.398 molar equivalents of $\equiv$NH radicals) in 465 g dry toluene was added to the contents of the flask via an addition funnel over a 10 minute period of time. 457 g of a dry solution of Polyol A in toluene (calculated to contain 0.795 molar equivalents of $\equiv$COH radicals) and 200 microliters of solution of 10% dibutyltindilaurate in toluene was then added to the stirring contents of the flask. The stirring contents of the flask was heated to 100° C. for 2 hours. After heating, the contents of the flask were cooled to 50° C. and 61.7 g of isocyanatoethylmethacrylate (0.398 molar equivalents of isocyanate radicals) was added to the stirring contents of the flask along with 2 g of triethylamine catalyst and 1 g hydroquinone. The contents were maintained at 50° C. until an infrared spectrogram of the contents showed that the isocyanate peak had essentially disappeared indicating that the reaction of the isocyanatoethylmethacrylate with the carbinol-functional prepolymer was essentially complete. Upon completion of the reaction, the contents of the flask were stripped under vacuum to remove the volatile toluene to obtain a silicone block copolymer of the same average formula shown for Silicone Block Copolymer A where Z, E, Q and T were the same as for Silicone Block Copolymer A and "a" had an average value of about 12.5 (hereinafter "Silicone Block Copolymer D").

Example 8 (10% methylmethacrylate monomer, 90% Silicone Block Copolymer D), Example 9 (20% methylmethacrylate monomer, 80% Silicone Block Copolymer D) and Example 10 (50% methylmethacrylate monomer, 50% Silicone Block Copolymer D) were made by dilution of Silicone Block Copolymer D with methylmethacrylate monomer. To facilitate incorporation of the free-radical curing catalyst into the compositions of each Example, a sufficient amount of 2,2-azo-bis-isobutyronitrile was added to the methylmethacrylate used to prepare each Example to provide 0.2 g of 2,2-azo-bis-isobutyronitrile per 100 g of total methylmethacrylate and Silicone Block Copolymer D present.

All molded samples made from the catalyzed compositions of Examples 8–10 were prepared by curing each catalyzed composition in a molding chase under about 20,000 p.s.i. of pressure for 15 minutes at 50° C. (to reduce loss of volatile monomer) followed by 15 minutes at 100° C. The molded samples were then post-cured in an oven for about 16 hours at 80° C. in a vacuum oven at 5 Torr pressure.

The results of the testing of the molded elastomer samples are reported in Table II. Examples 8 and 9 were generally lower in tensile strength, durometer and tear strength than Examples 1 and 2 and higher in elongation value, water absorption and permeability to water vapor. Example 10 produced a cured elastomer which was lower in tensile strength than Example 3, but was higher in elongation, durometer, tear values, water absorption and water vapor permeability. The advancing water-in-air contact angles for Examples 8 and 10 were comparable to Examples 1 and 3 while Example 9 had a much higher water-in-air contact angle than did Example 2 even though the water absorption of the cured elastomer of Example 9 was twice that for Example 2. This material would be considered as being hydrophilic in view of the water absorption characteristics.

Samples of each cured elastomer of Examples 8–10 were tested, in vitro, for cytopathic effect (direct contact and extract) as described for Examples 1–6. In direct contact, each cured elastomer was rated as having no cytopathic effect. Extracts from each cured elastomer using cottonseed oil were rated as having no cytopathic effect. The Minimum Essential Medium (i.e., the growth medium for the cells) extract from the cured elastomer of Example 10 was rated as having no cytopathic effect while the cured elastomers from Examples 8 and 9 were rated as having a cytopathic effect. The Minimum Essential Medium Extract test (a very sensitive test) was again run on the cured elastomers of Examples 8 and 9; the results were that Example 8 was rated as having a cytopathic effect and Example 9 was rated as having no cytopathic effect.

The same cured sample of Example 8 (previously tested twice) was submitted a third time for direct contact and Minimum Essential Medium extract testing along with two other samples of Example 8 one of which was made by curing the composition of Example 8 again for the same period of time as the above sample, and to make the other, a different sample of methylmethacrylate was added to Silicone Block Copolymer D and that composition was cured as above. All three samples were rated as having a cytopathic effect in the Minimum Essential Medium extract. It appears that some unknown material was being extracted and was causing a response; the identity of this material was not determined. All three of these samples were rated as having a cytopathic effect in direct contact with the cell layer. This was unexpected since none of the cured elastomers tested exhibited such a response when tested in direct contact, particularly the previous two samples of the cured elastomer of Example 8. No explanation for these results was readily apparent, especially in view of the results of the previous testing. It appears that further appropriate, conventional testing beyond this screening testing is warranted before such materials are used in contact with the body.

Example 11 was a silicone block copolymer of the above average formula which was prepared in the same manner as was Silicone Block Copolymer D using an amino-functional polydimethylsiloxane of the type shown at the beginning of the text for Examples 1–3 (amine equivalent of 577). The values of "e" and "a" in the above silicone block copolymer formula were expected to be close to that for Silicone Block Copolymer D. The number average molecular weight of Example 11 was determined to be 5100 and the weight average molecular weight was determined to be 14,000 using a conventional gel permeation chromatographic method using conventional polystyrene reference samples. Methylmethacrylate monomer was added to the polymer of Example 11 to produce compositions having the

TABLE II

| Ex. # | Dry Samples, 0% R.H.[1] | | | | Hydrated Samples[6] | | Advancing Contact Angle (°) | | Water Absorption 24 hours, Wt. % | | $P_{H_2O}$[8] |
|---|---|---|---|---|---|---|---|---|---|---|---|
| | Tensile[2] | Elong.[3] | Durom.[4] | Tear[5] | Tensile[2] | Elong.[3] | $H_2O$ | $CH_2I_2$ | IMMERS.[7] | 50% R.H.[1] | |
| 8 | 170 | 58 | 64 | 15 | 200 | 33 | 68 | 60 | 33 | 1.6 | 37.3 |
| 9 | 360 | 100 | 75 | 29 | 300 | 60 | 83 | 47 | 28 | 2.0 | 20.1 |
| 10 | 3267 | 105 | 93 | 346 | 1774 | 100 | 66 | 56 | 14 | 2.0 | 6.4 |

[1]R.H. = Relative Humidity
[2]Tensile strength at break in p.s.i.
[3]Elongation at break in %
[4]Shore A durometer value in points.
[5]Tear strength, die B, in pounds per linear inch (p.l.i.)/kilonewtons per meter (KN/m) where 1,000 p.l.i. = 175 kN/m.
[6]Immersed in distilled water for 5 days at room temperature before testing.
[7]Immersed in distilled water for 24 hours at room temperature before testing.
[8]Water vapor permeability in units of (mg $H_2O$) (mm)/($cm^2$) (24 hr).

EXAMPLES 11–25

In these Examples, a number of silicone block copolymers substantially having the average formula

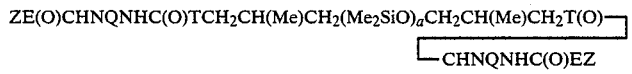

where Z is $CH_2=C(Me)COOCH_2CH_2NHC(O)-$, E is $-(OCH_2CH_2)_eO-$,

Q is 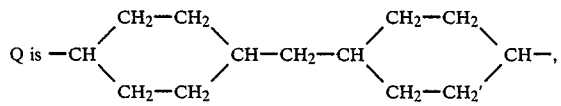

T is $-N(Me)-$ were made according to the general procedure described in Examples 8–10 using amino-functional polydimethylsiloxanes, polyethylene glycols and isocyanatoethylmethacrylate as reactants as described in those Examples to produce silicone block copolymers having the average values of "e" and "a" in the formula above which are described below. The silicone block copolymers were mixed with various amounts of methylmethacrylate monomer, catalyzed with 2,2-azo-bis-isobutyronitrile and cured as described for Examples 8–10. The silicone block copolymers themselves were also catalyzed and cured in the same manner to form cured elastomers. The physical properties of the cured elastomers were evaluated and the results are reported in Table III. The normalized intrinsic release rate of progesterone and testosterone from certain of these cured elastomers was measured at 37° C. (body temperature) and a diffusion coefficient for each elastomer/hormone drug combination tested along with the drug solubility in the polymer was calculated. These results are reported in Table IV.

following amounts of methylmethacrylate ("MMA") and the polymer of Example 11 ("Ex. 11") by weight: Example 12-15% MMA, 85% Ex. 11; Example 13-30% MMA, 70% Ex. 11; Example 14-45% MMA; 55% Ex. 11. The cured elastomer of Example 14 was observed to have a rather high advancing water-in-air contact angle although it absorbed 13.2% by weight of water indicating that it was hydrophilic.

Example 15 was a silicone block copolymer of the above average formula which was prepared in the same manner as Silicone Block Copolymer D using stoichiometric amounts of reactants. Example 15 was prepared using an amino-functional polysiloxane of the type shown at the beginning of the text for Examples 1–3 (amine equivalent of 583), but the polyoxyethylene glycol used was one which had a nominal number average molecular weight of about 1,000. Thus, referring to the silicone block copolymer formula above, the silicone block copolymer of Example 15 had a calculated value of "e" of about 22 and a calculated value of "a" of about 12–13. The number average molecular weight of Example 15 was determined to be 5000 and the weight average molecular weight was determined to be 12,000 using a conventional gel permeation chromatographic method using conventional polystyrene reference samples. Methylmethacrylate monomer was added to the polymer of Example 15 to produce compositions having the following amounts of methylmethacrylate ("MMA") and the polymer of Example 15 ("Ex. 15") by weight: Example 16-22.5% MMA, 77.5% Ex. 15; and Example 17-45% MMA, 55% Ex. 15.

Example 18 was a silicone block copolymer of the above average formula which was prepared in the same manner as Silicone Block Copolymer D using stoichiometric amounts of reactants. Example 18 was prepared using an amino-functional polysiloxane of the type shown at the beginning of the text for Examples 1–3 (amine equivalent of 677), but the polyoxyethylene glycol used was one which had a nominal number average molecular weight of about 1,450. Thus, referring to the silicone block copolymer formula above, the silicone block copolymer of Example 18 had a calculated value of "e" of about 32–33 and a calculated value of "a" of about 15. The number average molecular weight of Example 18 was determined to be 4,600 and the weight average molecular weight was determined to be 11,000 using a conventional gel permeation chromatographic method using conventional polystyrene reference samples. Methylmethacrylate monomer was added to the polymer of Example 18 to produce a composition (Example 19) having 22.5% methylmethacrylate and 77.5% of the polymer of Example 18.

Example 20 was a silicone block copolymer of the above average formula which was prepared in the same manner as Silicone Block Copolymer D using stoichiometric amounts of reactants. Example 20 was prepared using an amino-functional polysiloxane of the type shown at the beginning of the text for Examples 1–3 having about three times the polydimethylsiloxane content of Silicone Block Copolymer D (amine equivalent of 1653), and the polyoxyethylene glycol used was one which had a nominal number average molecular weight of about 600. Thus, in the silicone block copolymer formula above, the silicone block copolymer of Example 20 had a calculated value of "e" of about 13 and a calculated value of "a" of about 41–42. The number of average molecular weight of Example 20 was determined to be 6,200 and the weight average molecular weight was determined to be 27,000 using a conventional gel permeation chromatographic method using conventional polystyrene reference samples. Methylmethacrylate monomer was added to the polymer of Example 20 to produce compositions having the following amounts of methylmethacrylate ("MMA") and the polymer of Example 20 ("Ex. 20") by weight: Example 21–15% MMA, 85% Ex. 20; Example 22–30% MMA, 70% Ex. 20; Example 23–45% MMA; 55% Ex. 20.

Example 24 was a silicone block copolymer of the above average formula which was prepared in the same manner as Silicone Block Copolymer D using stoichiometric amounts of reactants. Example 24 was prepared using an amino-functional polysiloxane of the type shown at the beginning of the text for Examples 1–3 which contained about three times the dimethylpolysiloxane content of Silicone Block Copolymer D (amine equivalent of 1646), and the polyoxyethylene glycol used was one which had a nominal number average molecular weight of about 1,450. Thus, in the silicone block copolymer formula above, the silicone block copolymer of Example 24 had a calculated value of "e" of about 32–33 and a calculated value of "a" of about 41. The number average molecular weight of Example 24 was determined to be 10,000 and the weight average molecular weight was determined to be 45,000 using a conventional gel permeation chromatographic method using conventional polystyrene reference samples. Methylmethacrylate monomer was added to the polymer of Example 24 to produce a composition (Example 25) having 45% methylmethacrylate and 55% of the polymer of Example 24.

Table III illustrates the effect of varying the amounts of polydimethylsiloxane content, polyoxyethylene content and monomer content on the physical properties of the copolymers of the present invention. Generally, increasing the amount of monomer improved the tensile strength of the cured elastomers while the permeability to water vapor and water absorption decreased. Examples 20–23 (highest polydimethylsiloxane content and lowest polyoxyethylene content tested) tended to have advancing water-in-air contact angles in the 80–85 degree range even though the cured elastomers absorbed a significant amount of water.

Table IV describes the results of the testing of nominal 0.020 inch (0.05 centimeter) membranes of the cured elastomers made from the compositions shown in Table IV for permeability to testosterone and progesterone. A conventional Ghannom-Chien membrane permeation apparatus was used to carry out this testing according to the procedure described by K. Tojo, Y. Sun, M. Ghannom, and Y. W. Chien in "Characterization of a Membrane Permeation System For Controlled Drug Delivery Studies", AIChE Journal, vol. 31, no. 5, pages 741–746, May, 1985. The Ghannom-Chien apparatus contains two temperature-controlled cells equipped with stirrers. The two cells are separated by the membrane to be tested. One cell is filled with a solution containing the drug to be evaluated and the other cell is filled with a neat solution and is the receiving cell for the drug which has permeated through the membrane. The testing was done at a cell temperature of 37° C. using a stir rate of 425 r.p.m. The solution used was 40/60 volume/volume solution of polyethylene glycol having a nominal molecular weight of 400/distilled water. The slope of the total concentration of the hormone drug present in the receiving cell versus time adjusted by a normalizing factor based on the cell dimensions was multiplied by the normalized membrane thickness to obtain the normalized intrinsic Release Rate in micrograms/centimeter * seconds ("Release Rate") reported in Table IV. The data obtained by spectrometrically monitoring the increase in concentration of hormone drug in the receiving cell versus time was used to calculate the Diffusion Coefficient in square centimeters/second reported in Table IV. The quotient of the Release Rate divided by the Diffusion Coefficient gives a relative measure of the Drug Solubility (in micrograms per cubic centimeter) of the drug in the cured elastomer. A sample of a peroxide-vulcanized silicone elastomer was also included in the testing as a comparative Example of the permeation characteristics of progesterone and testosterone through a polydimethylsiloxane elastomer which is a hydrophobic elastomer which is essentially non-water absorbent.

The results shown in Table IV indicate that increasing the amount of polyoxyethylene content in the silicone block copolymer resulted in an increased Release Rate of testosterone as shown for Examples 11, 15 and 18. Increasing the amount of polydimethylsiloxane content resulted in a decrease in Release Rate of testosterone as shown for Examples 11 and 21. Permeability to testosterone and progesterone generally decreased with increasing amounts of methylmethacrylate content. The diffusion coefficients generally followed the same trends with the exception of Examples 15–17. For Examples 15 and 17, the values for progesterone appeared to follow the same trends. The Drug Solubility values for the cured elastomers of the present invention were typically much higher than those observed for the control polydimethylsiloxane elastomer. The Examples show that, for a specific drug, the Release Rate and the Diffusion Coefficient for the cured elastomers of the present invention can be varied by changing the polydimethylsiloxane content and/or the polyoxyethylene content of the silicone block copolymers of the present invention and/or by changing the amount of methylmethacrylate used to make the cured elastomer.

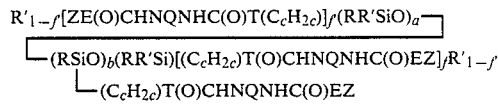

wherein Z is $CH_2\!\!=\!\!CR''COOR'''NHCO-$,

TABLE III

| Ex. # | Dry Samples, 0% R.H.[1] | | | | Hydrated Samples[6] | | Advancing Contact Angle (°) | | Water Absorption 24 hours, Wt. % | | $P_{H_2O}$[8] | % MMA[9] |
|---|---|---|---|---|---|---|---|---|---|---|---|---|
| | Tensile[2] | Elong.[3] | Durom.[4] | Tear[5] | Tensile[2] | Elong.[3] | $H_2O$ | $CH_2I_2$ | IMMERS.[7] | 50% R.H.[1] | | |
| 11 | 300 | 32 | 70 | 16.5 | 240 | 21 | 75 | 69 | 35.6 | 1.78 | 22.7 | 0 |
| 12 | 280 | 48 | 67 | 55 | 180 | 28 | 78 | 48 | 32.5 | 1.72 | 12.6 | 15 |
| 13 | 1700 | 102 | 93 | 157 | 680 | 68 | 77 | 61 | 23.5 | 0.94 | 10.8 | 30 |
| 14 | 3500 | 76 | 95 | 347 | 1580 | 72 | 87 | 60 | 13.2 | 1.0 | 4.72 | 45 |
| 15 | 230 | 46 | 60 | 9 | 190 | 27 | 74 | 46 | 79.9 | 7.5 | 38.2 | 0 |
| 16 | 320 | 77 | 75 | 25 | 340 | 45 | 74 | 46 | 56.8 | 2.0 | 24.1 | 22.5 |
| 17 | 3020 | 130 | 93 | 401 | 1300 | 57 | 77 | 56 | 30.2 | 1.2 | 13.4 | 45 |
| 18 | 44 | 53 | 61 | 8 | 0 | 0 | 75 | 68 | 104 | 2.2 | 46.7 | 0 |
| 19 | 209 | 57 | 65 | 6 | 133 | 33 | 75 | 64 | 73 | 2.0 | 74.5 | 22.5 |
| 20 | 150 | 34 | 55 | 6 | 90 | 18 | 85 | 62 | 22.1 | 1.39 | 9.58 | 0 |
| 21 | 290 | 71 | 65 | 23 | 180 | 42 | 83 | 50 | 16.5 | 0.98 | 7.59 | 15 |
| 22 | 1450 | 104 | 89 | 116 | 670 | 87 | 80 | 51 | 9.92 | 0.70 | 3.85 | 30 |
| 23 | 1020 | 55 | 95 | 110 | 1420 | 66 | 81 | 49 | 6.05 | 0.60 | 3.02 | 45 |
| 24 | 72 | 72 | 40 | 41 | 10 | 27 | 70 | 69 | 104 | — | 55.9 | 0 |
| 25 | 159 | 58 | 56 | 14 | 100 | 38 | 70 | 52 | 63 | — | 33.9 | 22.5 |

[1]R.H. = Relative Humidity
[2]Tensile strength at break in p.s.i.
[3]Elongation at break in %
[4]Shore A durometer value in points.
[5]Tear strength, die B, in pounds per linear inch (p.l.i.)/kilonewtons per meter (kN/m) where 1,000 p.l.i. = 175 kN/m.
[6]Immersed in distilled water for 5 days at room temperature before testing.
[7]Immersed in distilled water for 24 hours at room temperature before testing.
[8]Water vapor permeability in units of (mg $H_2O$) (mm)/(cm$^2$) (24 hr).
[9]% MMA = weight percent methylmethacrylate present in total composition.

TABLE IV

| Example No. | % MMA[1] | Drug[2] | Release Rate (mg/cm·sec) | Diffusion Coefficient (cm$^2$/sec) | Drug Solubility[3] (mg/cm$^3$) |
|---|---|---|---|---|---|
| 11 | 0 | T | $8.02 \times 10^{-5}$ | $8.63 \times 10^{-9}$ | 9,300 |
| 12 | 15 | T | $6.52 \times 10^{-5}$ | $5.04 \times 10^{-9}$ | 12,900 |
| 13 | 30 | T | $9.4 \times 10^{-6}$ | $2.93 \times 10^{-9}$ | 3,200 |
| 15 | 0 | T | $1.94 \times 10^{-4}$ | $3.24 \times 10^{-8}$ | 5,990 |
| 16 | 22.5 | T | $9.75 \times 10^{-5}$ | $8.09 \times 10^{-9}$ | 12,050 |
| 17 | 45 | T | $1.28 \times 10^{-5}$ | $3.11 \times 10^{-9}$ | 4,120 |
| 15 | 0 | P | $1.96 \times 10^{-4}$ | $2.04 \times 10^{-8}$ | 9,610 |
| 17 | 45 | P | $1.60 \times 10^{-5}$ | $1.78 \times 10^{-9}$ | 8,990 |
| 18 | 0 | T | $3.14 \times 10^{-4}$ | $5.13 \times 10^{-8}$ | 6,120 |
| 19 | 22.5 | T | $2.44 \times 10^{-4}$ | $1.02 \times 10^{-8}$ | 23,920 |
| 19 | 22.5 | P | $1.01 \times 10^{-4}$ | $1.25 \times 10^{-8}$ | 8,080 |
| 21 | 15 | T | $3.78 \times 10^{-5}$ | $5.25 \times 10^{-9}$ | 7,200 |
| 22 | 30 | T | $2.35 \times 10^{-5}$ | $2.87 \times 10^{-9}$ | 8,200 |
| 24 | 0 | T | $2.81 \times 10^{-4}$ | $1.61 \times 10^{-8}$ | 17,450 |
| 25 | 22.5 | T | $1.79 \times 10^{-4}$ | $1.22 \times 10^{-8}$ | 14,670 |
| PDMS[4] | 0 | T | $5.55 \times 10^{-5}$ | $6.55 \times 10^{-7}$ | 85 |
| PDMS[4] | 0 | P | $5.63 \times 10^{-4}$ | $8.94 \times 10^{-7}$ | 630 |

[1]Weight Percent Methylmethacrylate in total composition.
[2]T = testosterone, P = progesterone.
[3]Quotient of Release Rate divided by Diffusion Coefficient.
[4]Control sample of a peroxide-vulcanized polydimethylsiloxane elastomer.

That which is claimed is:

1. A method of controlling the delivery of a bioactive agent to a substrate, comprising the steps of:
    (a) contacting the substrate with a membrane formed from a water absorbing, hydrophilic silicone organic elastomer comprising a polymerization product formed from a composition consisting essentially of
    (A) from 50 to 95 parts by weight of at least one block copolymer of the formula

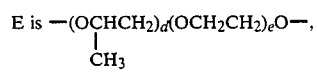

E is $-(\text{OCHCH}_2)_d(\text{OCH}_2\text{CH}_2)_eO-$,
         |
        $CH_3$ Q is a divalent radical obtained by removing the NCO radicals from a diisocyanate selected from the group consisting of aliphatic, cycloaliphatic and aromatic diisocyanates, T is a divalent radical selected from the group consisting of $-NR''-$ and $-O-$ wherein said T is attached to a carbon atom on $-C_cH_{2c}-$ which is at least the third carbon atom away from the silicon atom to which the —$C_cH_{2c}$— radical is attached, a is an integer of from 4 to 49, inclusive, b is an integer of from 0 to 15, inclusive, c is an integer having a value of 3 or 4, d is an integer of from 0 to 25, inclusive, e is an integer of from 5 to 50 inclusive, d+e is no greater than 50 and e is greater than or equal to d, f is 0 or 1, f' is 0 or 1, f+f'+b is at least 2, R is a monovalent hydrocarbon or halohydrocarbon radical of from 1 to 6 inclusive carbon atoms which is free of aliphatic unsaturation, R' is a methyl or a phenyl radical, R'' is an alkyl radical of from 1 to 4 inclusive carbon atoms or hydrogen, and R''' is a divalent hydrocarbon radical of from 2 to 6 inclusive carbon atoms, and (B) from 5 to 50 parts by weight of at least one substantially water insoluble aliphatically unsaturated organic monomer which is compatible with said (A)

cured by maintaining the composition under free radical polymerization conditions for a sufficient amount of time to obtain said polymerization product, said polymerization product being capable of absorbing at least 3% by weight of water based upon the total weight of said polymerization product before exposure to water, and (b) contacting the membrane with a reservoir of the bioactive agent.

2. A method as claimed in claim 1 wherein the bioactive agent is a drug and the substrate is a patient's body.

3. A method as claimed in claim 1, wherein said (B) is at least one monomer of the formula

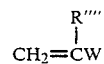

wherein W is selected from the group consisting of —COOR'''', —OOCCH$_3$ and —C$_6$H$_5$ wherein R'''' is an alkyl radical of from 1 to 6 inclusive carbon atoms and a is an integer of from 8 to 14, inclusive, d is O, e is an integer of from 10 to 20, inclusive, R is a methyl, phenyl or 3,3,3-trifluoropropyl radical, T is —NR''''— and Z is CH$_2$=CR''COO(CH$_2$)$_2$NHCO—.

4. A method as claimed in claim 3, wherein the bioactive agent is a drug and the substrate is a patient's body.

5. A method as claimed in claim 3, wherein R and R' are each methyl radicals, b is 0, c is 4, R'' is —CH$_3$ and Q is selected from the group consisting of

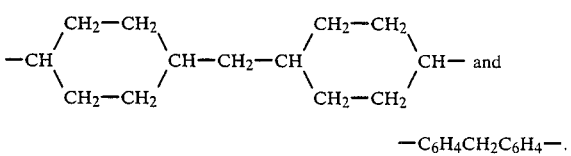

—C$_6$H$_4$CH$_2$C$_6$H$_4$—.

6. A method as claimed in claim 5, wherein the bioactive agent is a drug and the substrate is a patient's body.

* * * * *